UNITED STATES PATENT OFFICE.

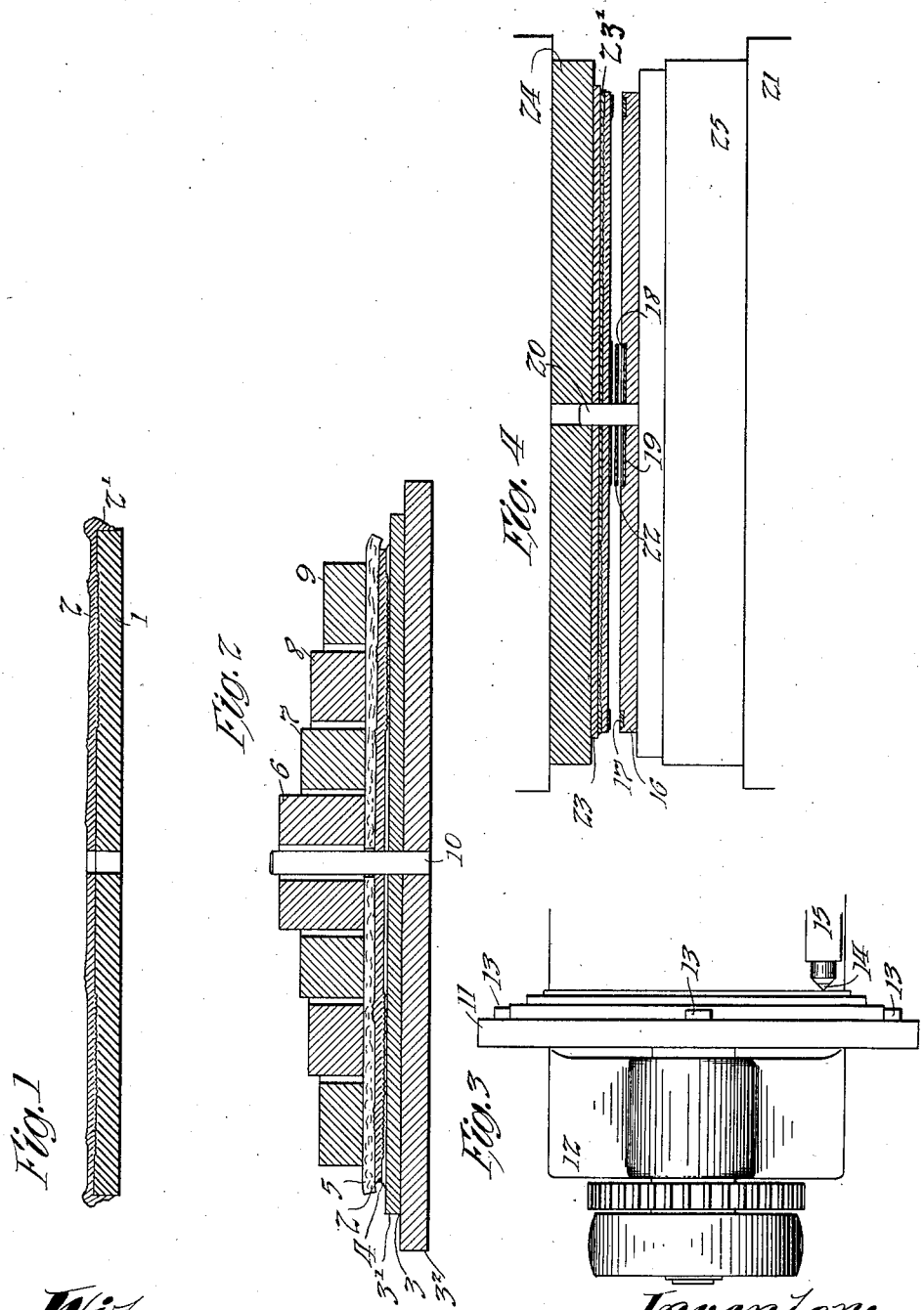

SHERWOOD T. MOORE, OF WEST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

METHOD OF FORMING SOUND-RECORD MOLDS.

1,097,985.  Specification of Letters Patent.  Patented May 26, 1914.

Application filed December 2, 1911. Serial No. 663,520.

*To all whom it may concern:*

Be it known that I, SHERWOOD T. MOORE, a citizen of the United States, and a resident of West Orange, in the county of Essex and State of New Jersey, have invented certain new and useful Improvements in Methods of Forming Sound-Record Molds, of which the following is a description.

My invention relates to methods of forming sound record molds, and more particularly molds for records of the flat or disk type.

The usual practice of making working molds for phonograph disk records is to electroplate a copper matrix or negative on a master or sub-master record, and, after detaching the matrix from the master or sub-master, to solder it to a thick metallic backing plate, the solder being applied over the whole of the contacting surfaces of the matrix and backing plate. The result of this is that the record surface of the mold and that of the sound record produced therefrom, instead of being plane, are formed with undulations or irregularities which are not noticeable except when light is reflected at a certain angle from the smooth part of the record surface. These irregularities are due to the uneven rear surface of the metallic matrix, to the tool marks on the metallic backing, to the unequal flow of the solder between the matrix and backing, and also to air entrapped between these two last named parts. When a reproducer adapted to operate upon records of the hill and dale or vertically undulating type is employed, these irregularities or undulations produce sounds which interfere greatly with the accuracy of the reproduction.

It is the principal object of my invention to produce a matrix and record free from the above named irregularities. In conformity with this object, I finish the contacting surfaces of the matrix and backing to a true plane, preferably by turning the same with a diamond tool, and secure the same together adjacent the periphery, and at the center of the said surfaces in such a way that the latter lie in close contact with each other.

Other objects of my invention will appear more fully in the following specification and appended claims.

In order that my invention may be more fully understood, attention is hereby directed to the accompanying drawing forming a part of this specification in which—

Figure 1 is a central vertical sectional view of a master record with a matrix formed thereon; Fig. 2 is a similar view illustrating the matrix and apparatus for mounting of the same prior to the finishing of the rear surface thereof; Fig. 3 is a plan view illustrating the matrix and apparatus for finishing of the rear surface of the matrix; and Fig. 4 is a central vertical sectional view, partly in elevation, of the matrix and backing together with apparatus for securing the same together.

In all of the views like parts are designated by the same reference numerals.

In carrying out my invention, I first make a waxlike master 1 and plate thereon a metallic matrix 2, preferably of copper, after which I remove the master in any desirable way. I then cut off the annular flange 2' at the edge of the matrix and secure the latter by a soft adhesive cement 4 such, for example, as a mixture of rosin and beeswax, to a suitable supporting plate 3, the record surface of the matrix being embedded in the cement as clearly shown in Fig. 2 in order to protect the said surface and to expose the rear surface of the matrix. As shown in Fig. 2, the plate 3 is composed of a plate 3' to which the matrix is secured and a heavy plate $3^2$ soldered or secured in any other suitable way to the back of the plate 3', but it is obvious that the plate 3 could be a single unitary member. In securing the matrix to the plate 3, I apply a layer 4 of cement to the top of the said plate, superpose the matrix with the record surface thereof downward on the cement, place a sheet of felt or other soft yielding material on the rear face of the matrix, apply sufficient heat to render the cement fluid, and then apply pressure to the top of the felt to force the matrix into the cement. This pressure is preferably applied from the center of the matrix toward the periphery thereof so as to cause an even distribution of the cement between the matrix and the plate 3. As shown in the drawings, this force is applied by means of a number of annular weights 6, 7, 8 and 9 adapted to be arranged concentrically with respect to and on top of the disk 5, the inner diameter of each weight being slightly larger than the outer diameter of the adjacent weight toward the center thereof. By applying the central weight first and then consecutively placing the remaining weights from the center outward upon the top of the disk of felt, the cement is caused to flow uniformly from the center of the matrix toward the periphery and the matrix becomes cemented in place without strain due to the irregular distribution of the cement.

The numeral 10 designates a centering pin preferably secured to the plate 3 and adapted to hold the parts in proper concentric relationship. Upon the cooling of the cement, the matrix will be firmly secured to the supporting plate. The next step in the formation of my improved mold consists in securing the plate 3 with the matrix thereon to the face plate 11 of a lathe 12, as shown in Fig. 3.

The numeral 13 designates the clutch members on the face plate of the lathe for engaging and holding the periphery of the member 3. A cutting tool provided with a natural diamond cutting edge 14 is mounted in the tool holder 15 of the lathe and is adapted to be moved across the face of the matrix in a well known manner during the rotation of the face plate of the lathe, the feed of the cutting tool across the face of the matrix being made very fine so that the amount of pressure on the diamond is small and the thin matrix disk is not subjected to any strains tending to scratch it. One of the faces of the backing plate or disk 16 is likewise turned off with a diamond-cutting tool and is subsequently formed adjacent its periphery with a shallow recess 17, preferably about ¼ of an inch wide and about .004 of an inch deep, and also with a recess 18 of approximately the same depth at the center of the said backing, the last named recess being about two inches in diameter. The recess 17 is now filled with solder which is wiped off flush with the finished or turned surface of the member 16. A thin coating 19 of solder is also applied to the recess 18. The rear or finished surface of the matrix is provided adjacent its edge and at its center, at the portions corresponding to the solder covered portions of the member 16, with a thin coating of solder and is then wiped almost free of the solder.

After the parts have been prepared in the manner described above, they are assembled about a centering pin 20 projecting from the member 16 which is placed with its finished face upward upon the member 21 of a suitable press, as shown in Fig. 4. A thin disk 22 of block tin is then placed on the pin 20, the diameter of the disk 22 being equal to or slightly smaller than the diameter of the recess 18 and the thickness thereof just sufficient to permit the same to rest upon the solder 19 with its upper face flush with the finished surface of the backing plate 16. After this the matrix is placed upon the pin 20 with its turned or finished surface facing the corresponding surface on the backing plate. A disk 23 of blotting paper is then superposed upon a sheet 23' of paper coated with graphite, the coated surface of the paper being placed in contact with the record surface of the matrix, after which upper or movable member 24 of the press is lowered to force the matrix and its backing into firm engagement with each other. Sufficient heat is applied, as by a heated plate 25 in the press, to cause the solder to flow, after which the matrix may be allowed to cool and taken from the press. It may in some instances be desirable to run a soldering iron around the edge of the matrix and backing to insure even melting of the solder at the periphery of the same.

When the mold is made in the manner described above, the contacting faces of the matrix and backing are absolutely true and no solder or other securing means prevents their close engagement under the portion of the mold containing the record impression. The surface of the matrix is accordingly free from the imperfections or undulations referred to above; and a sound record having an equally perfect and true surface may now be formed therefrom.

While I have disclosed my preferred method and means for forming my improved mold, various modifications are possible therein, it being only necessary that the contacting surfaces of the matrix and backing be perfectly plane and secured together in close contact. I wish it, therefore, to be understood that my invention is limited only as defined by the terms of the appended claims.

What I claim as new and desire to protect by Letters Patent is as follows:

1. The method of forming duplicate sound record molds which consists in forming a matrix of the original record and a backing plate for said matrix, truing the back of the matrix and one of the surfaces of said plate with a diamond cutting tool to plane surfaces free from undulations or irregularities, and securing the matrix and backing plate to each other with the portions of the trued surfaces thereof under the record impression in contact, substantially as described.

2. The method of forming duplicate sound record molds which consists in forming a matrix of the original record and a backing plate for said matrix, truing the back of the matrix and one of the surfaces of said plate to plane surfaces free from undulations or irregularities, and soldering the trued surfaces together only adjacent their peripheries and at the centers thereof, the portions of the said surfaces under the record impression being in close contact with each other, substantially as described.

3. The method of forming duplicate sound record molds which consists in forming a matrix of the original record and a backing plate for said matrix, truing the rear surface of the matrix and one of the surfaces of said backing plate to plane surfaces free from irregularities, forming a recess in one of said surfaces adjacent the periphery thereof, filling the said recess with solder and applying a very thin coating of solder to the other of said surfaces adjacent the periphery thereof, pressing said matrix and backing together with their solder covered portions in contact while heating the same to cause the solder to melt, and allowing the same to cool, substantially as described.

4. The method of forming duplicate sound record molds which consists in forming a matrix of the original record and a backing plate for said matrix, truing the rear surface of the matrix and one of the surfaces of said backing plate to plane surfaces free from irregularities, forming shallow recesses in one of said surfaces at the center and adjacent the periphery thereof, filling said recesses with solder and applying a very thin coating of solder to the other of said surfaces adjacent the periphery and at the center thereof, pressing said matrix and backing together with their solder covered portions in contact while heating the said parts to cause the solder to melt, and allowing the same to cool, substantially as described.

5. The method of forming duplicate sound record molds which consists in forming a matrix of the original record and a backing plate for said matrix, truing the rear surface of the matrix and one of the surfaces of said backing plate to free the same from irregularities, forming a recess in one of said surfaces, applying a coating of solder to the bottom of said recess and to the other of said surfaces at a given position thereon, pressing said matrix and backing plate together with a sheet of metal in said recess and in contact with the solder covered portions of said surfaces while applying heat to cause the solder to melt, and allowing the mold thus formed to cool, substantially as described.

6. The method of forming duplicate sound record molds which consists in forming a matrix of the original record and a backing plate for said matrix, truing the rear surface of the matrix and one of the surfaces of said backing plate to plane surfaces free from irregularities, forming shallow recesses in one of said surfaces at the center and adjacent the periphery thereof, filling the recess at the periphery with solder and applying a coating of solder to the bottom of the other recess and to the other of said surfaces adjacent the periphery and at the center thereof, pressing the said matrix and backing together with the solder covered portions thereof at the periphery in contact and with a sheet of block tin between and in contact with the solder covered portions at the center thereof, while heating the said parts to cause the solder to melt, and allowing the said parts to cool, substantially as described.

7. The method of forming duplicate sound record molds which consists in forming a matrix of the original record and backing plate for said matrix, truing the rear surface of the matrix and one of the surfaces of said plate so as to free said surfaces from undulations or irregularities, and soldering the trued surfaces together at their peripheries, and with the portions of said surfaces under the record impression in close contact with each other, substantially as described.

8. The method of forming duplicate sound record molds which consists in forming a matrix of the original record and a backing plate for said matrix, truing the rear surface of the matrix and one of the surfaces of said backing plate to free the same from irregularities, forming a recess in one of said surfaces adjacent the center thereof, applying a coating of solder to the bottom of said recess and to the other of said surfaces adjacent the center thereof, pressing said matrix and backing plate together with a sheet of block tin in said recess and in contact with the solder covered portions of said surfaces while applying heat to cause the solder to melt, and allowing the mold thus formed to cool, substantially as described.

9. The method of forming duplicate sound record molds which comprises forming a matrix of the original record, placing the same face downward on a layer of cement applied to the face of a supporting plate, applying heat to soften the cement, pressing the matrix into the cement, permitting the cement to cool and truing the rear surface of the matrix, substantially as described.

10. The method of forming duplicate sound record molds which comprises forming a matrix of the original record, placing the same face downward on a layer of cement applied to the face of a supporting plate, applying heat to soften the cement, pressing the matrix from the center outward into the cement, permitting the cement to cool and truing the rear surface of the matrix, substantially as described.

This specification signed and witnessed this 29th day of November 1911.

SHERWOOD T. MOORE.

Witnesses:
FREDERICK BACHMANN,
ANNA R. KLEHM.

Copies of this patent may be obtained for five cents each, by addressing the "Commissioner of Patents, Washington, D. C."